United States Patent [19]
Trouchet

[11] Patent Number: 5,930,419
[45] Date of Patent: Jul. 27, 1999

[54] WAVELENGTH DEMULTIPLEXER CONSTRUCTED USING INTEGRATED OPTICS

[75] Inventor: Denis Marcel Trouchet, Quincy sous Senart, France

[73] Assignee: Corning, Inc., Corning, N.Y.

[21] Appl. No.: 08/913,004

[22] PCT Filed: Dec. 9, 1996

[86] PCT No.: PCT/US96/19865

§ 371 Date: Apr. 6, 1998

§ 102(e) Date: Apr. 6, 1998

[87] PCT Pub. No.: WO97/23969

PCT Pub. Date: Jul. 3, 1997

[30] Foreign Application Priority Data

Dec. 22, 1995 [FR] France ................................... 95 15372

[51] Int. Cl.$^6$ .................................................. G02B 6/26
[52] U.S. Cl. .............................. 385/27; 385/24; 385/28; 385/22
[58] Field of Search ................................. 385/27, 14, 28, 385/24, 22, 37, 39, 42, 45, 49; 359/124, 127, 130, 116

[56] References Cited

U.S. PATENT DOCUMENTS 5,680,236 10/1997 Van Der Tol ............................ 359/127

*Primary Examiner*—Phan T. H. Palmer
*Attorney, Agent, or Firm*—William J. Chervenak

[57] ABSTRACT

The demultiplexer comprises: a) an inlet wave-guide (1); b) a plurality of outlet wave-guides (5$_i$); c) an assembly (3) of adjacent integrated wave-guides functioning in the form of a phase network; d) a mode-expanding wave-guide (12) arranged at the inlet of the inlet connector (2) and connected to the inlet wave-guides (1); and e) a plurality of mode-reducing wave-guides (16$_i$) arranged at the outlet of the outlet connector (4) and connected in each case to one of the outlet wave-guides (5$_i$). The mode-expanding guide (12) and the aforementioned mode-reducing guides (16$_i$) are of identical geometry with a width that varies linearly in accordance with their length, whereby the width of the aforementioned expanding and reducing guides at their connection to the associated connector is defined in order to optimize the width of the band passing through a channel while limiting the cross-talk between the outlet channels (5$_i$) to a predetermined level.

9 Claims, 2 Drawing Sheets

WAVELENGTH DEMULTIPLEXER CONSTRUCTED USING INTEGRATED OPTICS

The present invention relates to a wavelength demultiplexer that is constructed using integrated optics and, more particularly, such a demultiplexer that comprises a) at least one inlet wave-guide that is fed by a plurality of optical signals in several different wavelength channels; b) a plurality of outlet wave-guides, whereby each one is traversed by one of the aforementioned wavelength channels; c) an assembly of adjacent integrated wave-guides connected from one side to the inlet wave-guides and, from the other side, to the outlet wave-guides through an inlet connector and an outlet connector, respectively, whereby the lengths of the guides of the assembly increase incrementally from guide to guide in a manner such that the assembly constitutes a phase network; d) a mode-expanding wave-guide arranged at the inlet of the inlet connector; and e) a plurality of mode-reducing wave-guides arranged at the outlet of the outlet connector and connected in each case to one of the outlet wave-guides.

Such demultiplexers are known, in particular, from U.S. Pat. No. 5,002,350. In order to minimize optical losses, mention is made in this document of close proximity coupling between the guides of the assembly of integrated wave-guides that form a phase network at the location of the outlet of the inlet connector and of the inlet of the outlet connector. This connection is unfavorable to the [type of] demultiplexation, that was investigated, in the way that this is established in U.S. Pat. No. 5,136,671. In addition, an important problem in such a demultiplexer is that of optimizing the width of the band passing into each of the separated channels for an acceptable predetermined cross-talk limit level.

As its objective, the present invention aims precisely to construct an optical wavelength demultiplexer with small losses of luminous energy without recourse to the strong coupling mentioned above in which the width of the band passing through each of the separated channels is optimized in accordance with a low predetermined level of cross-talk.

One achieves these objectives of the invention as well as others that will appear on reading the description, that is going to follow, with an optical wavelength demultiplexer of the type described above that is noteworthy in regard to the feature that the mode-expanding guide is arranged at the inlet of the inlet connector and is connected to the inlet guide and the mode-reducing guides are arranged at the outlet of the outlet connector and are each connected to the outlet wave-guides and are identical in terms of geometry with a width that varies linearly in accordance with their length and the width of the aforementioned expanding and reducing guides at their connection to the associated connector is fixed in order to optimize the width of the band passing through a channel while limiting the cross-talk between the outlet channels to a predetermined level.

In accordance with one preferred form of embodiment of the invention, the arrangement also comprises a mode-reducing wave-guide between the inlet connector and one end of each of the guides of the assembly of wave-guides that form a phase network and a mode-expanding wave-guide between the other end of each of the guides of this assembly and the outlet connector, whereby these expanding and reducing guides are identical in terms of geometry, with a width varying linearly in accordance with their length and whereby they are provided with dimensions for reducing proximity coupling between the guides of the aforementioned assembly at a predetermined low level.

Other characteristics and advantages of the present invention will appear on reading the description, that is going to follow, and on examining the appended drawing in which.

Figures 2, 3:
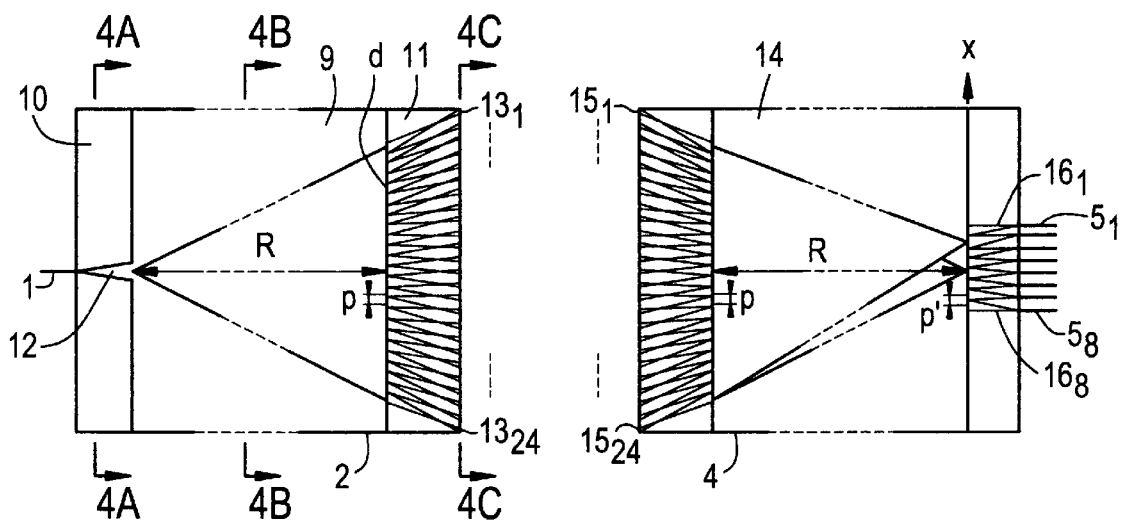
FIGS. 2 and 3 are arrangements of the inlet connector and the outlet connector, respectively, that form part of the demultiplexer of FIG. 1.
Figure 4A:
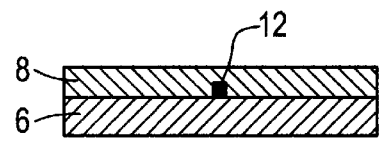
Figure 4B:
Figure 4C:
Figure 5:
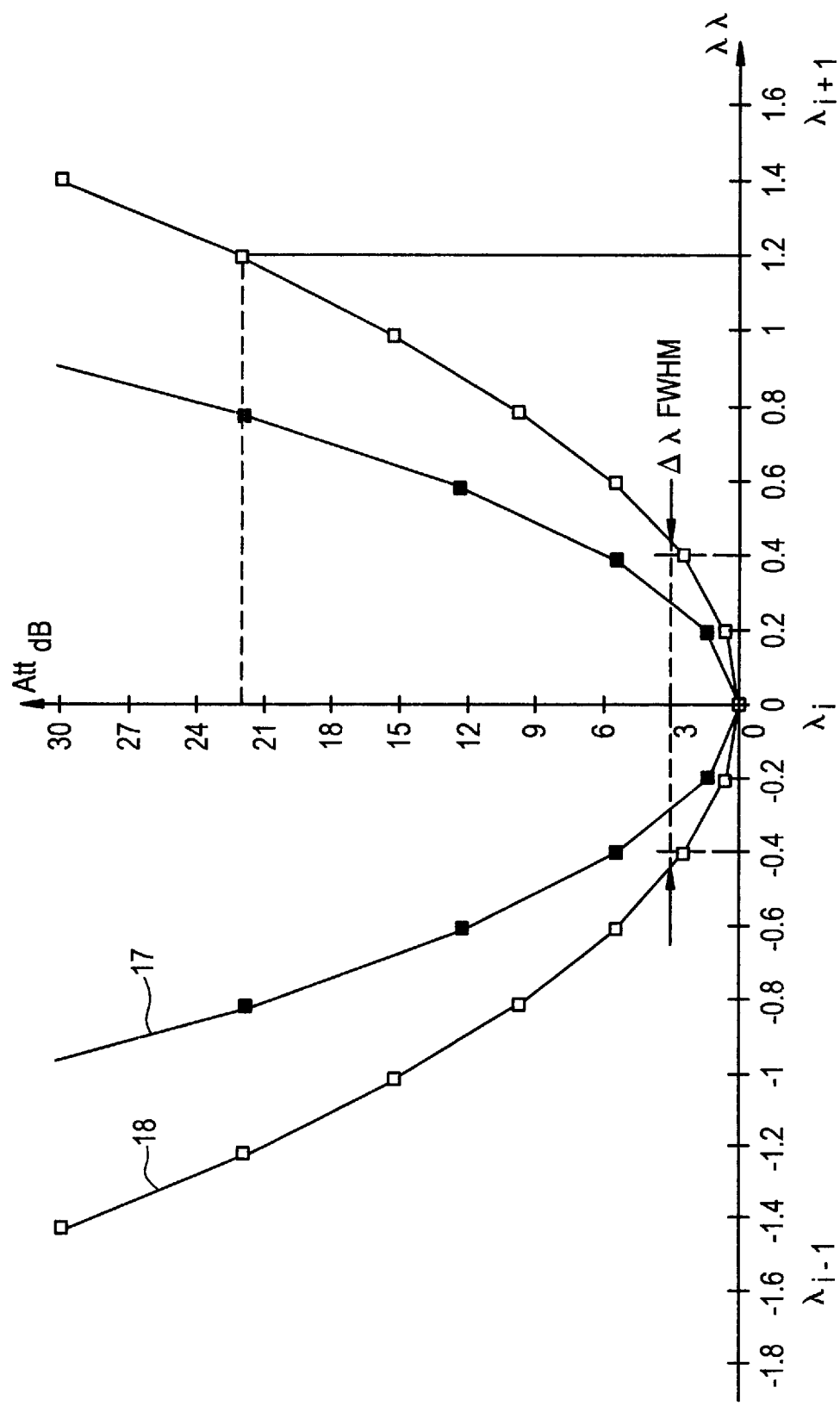

FIG. 4 brings together three schematic sections of the connector of FIG. 2 taken in accordance with the section lines A, B and C of this figure, and FIG. 5 is a graph that permits one to explain the process of optimizing the width of the band passing through a channel as a function of the accepted cross-talk limit level, whereby this is implemented using the design of the demultiplexer in accordance with the invention.

Figure 1:
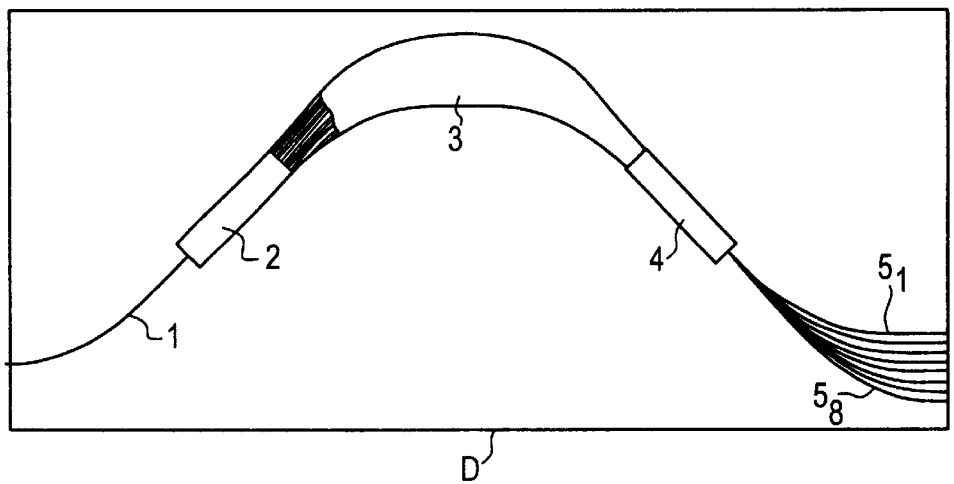
FIG. 1 is an arrangement showing the principal elements of the demultiplexer in accordance with the invention.

One should refer to FIG. 1 of the appended drawing, where it appears that the demultiplexer D in accordance with the invention comprises, in a known manner, an inlet wave-guide 1, an inlet connector 2 that is installed between the guide 1 and an adjacent assembly or network 3 of adjacent wave-guides of which the ends opposite to those that are connected to the connector 2 are connected to an outlet connector 4 interposed between these ends and N outlet wave-guides $5_1$ to $5_n$ (N=8 in the example shown).

With the exception of the various mode-expanders and reducers, all the wave-guides of the demultiplexer in accordance with the invention are mono-modal. These guides as well as the connectors are integrated into a flat substrate made from glass by means, for example, of any of the well known techniques using integrated optics, such as ion diffusion or chemical deposition in the vapor phase (known by the acronym CVD).

By way of an example that is illustrative and not limitative, the demultiplexer of FIG. 1 can receive modulated rays at the inlet of the guide 1 from eight laser diodes; these rays are centered on wavelengths $\lambda_1$ to $\lambda_8$ situated around 1,550 nm, whereby the separation of these wavelengths is equal to $\Delta\lambda$=1.6 nm, for example. The function of this demultiplexer is to separate the rays, that have been mixed in this way in the guide 1, in such a way that the rays with wavelengths $\lambda_1$ to $\lambda_?$ are found again in the outlet guides $5_1$ to $5_?$, respectively, at the outlet of the demultiplexer D.

In order to do this, the assembly 3 of wave-guides must function as a phase network. For this effect, it can comprise a plurality of adjacent wave-guides (25 for example) in a known manner, whereby the lengths of the wave-guides increase from guide to guide by an increment $\Delta L$. This increment $\Delta L$ defines a proportional de-phasing $\Delta\phi$ between the rays that are propagating in any two adjacent wave-guides of the assembly 3 that therefore functions as a phase network.

One should now refer to FIGS. 2 and 4 in the appended drawing for an explanation of the structure and functioning of the inlet connector 2. This is constructed, for example, by depositing a "core" layer on the substrate 6 of the demultiplexer D, that is engraved classically in accordance with the configuration of the wave-guides that are to be delineated, whereby this layer 7 is covered by a "sheathing" layer 8 in analogy with elements corresponding to a discrete optical fiber.

When examined in combination with the sections A, B and C of FIG. 4, it is found in FIG. 2 that the core layer 7 comprises a "free" propagation region 9, i.e. without lateral confinement, whereby this region 9 is interposed between the regions 10 and 11 where such confinement is present.

In region 10 of the core layer, one thus finds a central mode-expanding wave-guide 12; in the region 11, one finds a plurality of mode-reducing wave-guides $13_j$ (j=1 to 25 in the example shown). The inlet of the expander 12 is connected to the outlet of the inlet guide 1, whereas the outlet of the expander 12 is connected to the core region 9 in which the propagation of the rays is not confined laterally. These inlets of the mode-reducer 13 are distributed regularly, with a spacing p, transversely to the outlet of the region 9 on a circular arc of radius R of which the center of curvature coincides with the outlet of the mode-expander 12. These arrangements of FIGS. 2 and 4 have been strongly compressed axially. In the arrangement of FIG. 2 in particular, the arc of the circle of radius R that is used is assimilated into a segment of line d.

The inlet connector 1 could be connected to more than one inlet wave-guide and thus comprise as many mode-expanders that would be distributed on an arc of a circle of the same radius R and thus the center of curvature would be situated at the center of the arc of the circle defined by the inlets of the mode-reducers $13_j$ in accordance with a confocal arrangement.

Thus the light introduced into the wave-guide 1 traverses the expander 2 and diverges into the core region 9 (no lateral confinement) in order to be collected finally by the guides of the assembly 3 through the mode-reducers $13_j$.

The outlet connector 4 depicted by FIG. 4 is designed and constructed by following the principles expounded above in conjunction with the description of the inlet connector 2. The connector 4, like the connector 2, comprises a core region 14 in which the propagation of light is effected without lateral confinement and whereby this core region is connected to the outlets of the guides of the assembly 3 (the phase network) through a set of mode-expanding guides $15_j$ that are distributed regularly, in accordance with the spacing p, on an arc of a circle of radius R like the reducers $13_j$ of the connector 2.

The rays of wavelength $\lambda_i$ that are introduced into the inlet guide 1 of the demultiplexer D are each collected by one of the outlet guides $5_?$ through the mode-reducers $16_i$ that are arranged regularly, in accordance with a spacing p', on an arc of a circle of radius R in accordance with the confocal arrangement described for the connector 2. This is an appropriate choice of the curvi-linear abscissa x of each reducer $16_i$ on the arc of a circle of radius R and of spacing p' separating these reducers that permits one to achieve the desired demultiplexation of rays of wavelength $\lambda_i$ (i=1 to 8 in the form of embodiment depicted). One will demonstrate that this abscissa x can be expressed by the relationship:

$$n_w \cdot \Delta L + n_s p \frac{x_i}{R} = m\lambda_i$$

where:

$x_i$ is the abscissa corresponding to the wavelength $\lambda_i$;

$n_w$ and $n_s$ are the effective indices of a mode that is propagated in a wave-guide and in a plane guide (9 or 14) respectively;

is the diffraction order.

If one chooses to arrange the mode-reducers $16_i$ with a constant spacing p', then the central wavelength $\lambda_0$ of the group of demultiplexed wavelengths that is diffracted at the center of curvature of the arc formed by the mode-expanders $15_j$ at the outlet of the phase network 3 and the separation $\Delta\lambda$ of these wavelengths are expressed by the relationships:

$$\Delta L = m \frac{\lambda_0}{n_w}$$

$$\frac{dx}{d\lambda} = \frac{m \cdot R \cdot n_g}{n_s \cdot p \cdot n_w} = \frac{p'}{\Delta\lambda}, \text{ where}$$

$dx/d\lambda$ is the dispersion of the wavelengths of the device.
$n_g = n_w (1 - dn_w/d\lambda)$ is the group index.

Finally, the number N of outlet wave-guides $5_?$ must be maintained in the free spectral interval ISL of the phase network, or:

$$N\Delta\lambda < ISL = \frac{\lambda}{m}$$

In a general manner, the attenuation ($Att_{dB}$) expressed in decibels that is achieved by an optical device receiving a signal of power $P_1$ and transmitting a signal of power $P_2$ is represented in decibels (dB) by the relationship:

$$Att_{dB} = -10\log\left(\frac{P_2}{P_1}\right)$$

In accordance with an important characteristic of the demultiplexer D in accordance with the invention, the mode-expander 12 and the mode-reducers 16 are of identical geometry and have a tapering form, whereby their width varies linearly with their length. As one will be able to see further on in conjunction with an examination of the graphs in FIG. 5, the expansion or the reduction of the modes that they determine can be selected in such a way as to optimize the width of the band passing through a demultiplexed channel (to 3 dB for example) by maintaining a cross-talk limit level that is then measured by the attenuation of the residual optical signal at wavelengths of channels other than the demultiplexed channel.

In this regard, one should note that one could obtain limited cross-talk without using an expander such as the expander 12 of the device in accordance with the invention. However, at the outlet of the demultiplexer, the band passing through each channel would then be excessively narrow and the demultiplexer would be unusable.

In accordance with the invention again, the geometry of the mode-expanders and mode-reducers used at the inlet and at the outlet of the demultiplexer D are identical in such a way as to minimize losses of luminous energy because, in this way, one avoids all maladjustments of mode between the inlet guides and the outlet guides.

In accordance with another characteristic of the present invention, the mode-reducers $13_j$ and the mode-expanders $15_j$ installed at the two ends of the wave-guides of the phase network 3 are also of identical geometry with a width that varies linearly in accordance with their length and whereby they are provided with dimensions that reduce, to a negligible value, the proximity coupling between the guides of the network.

Proximity coupling is responsible for the transfer of light between a given guide of the network toward its neighboring guides and can also be characterized by the attenuation of the optical signal remaining in the guide after traversing the phase network. This attenuation can be calculated by means of the general relationship above if one supposes that a single guide of the network is excited by the signal $P_1$ and transmits the signal $P_2$. One considers here that proximity coupling between the guides of the network can be neglected if the attenuation of the signal in each guide of the network is greater than 20 dB. This characteristic, that is favorable for good functioning of the demultiplexer in accordance with the invention, is not present in the demultiplexer that is described in U.S. Pat. No. 5,002,350 that was cited earlier.

As one has indicated above, the mode-expander 12 and the mode-reducers $16_i$ are provided with those dimensions that are in accordance with the compromise to be attained between the cross-talk that is aimed for in the adjacent channels and the width, in terms of wavelengths, of the channels.

One has already indicated that the reducers $16_i$ placed at the outlet of the outlet connector 4 are arranged in such a way as to achieve selection in terms of the desired wavelength. In the case where one chooses to arrange the mode-reducers $16_j$ with a spacing p' (expressed in $\mu$m) that is constant, the demultiplexer with the dispersion dx/dλ (expressed in $\mu$m/nm) produces channels that are regularly separated by Δλ (expressed in nm) in terms of wavelengths in accordance with the relationship:

$$p' = \frac{dx}{d\lambda}\Delta\lambda$$

In the case where the inlet connectors 12 and the outlet connectors 4 are provided with identical dimensions, the mode diffracted by the phase network 3 at the outlet of the outlet connector 4 is identical to the mode formed at the outlet of the mode-expander 12 at the inlet of the inlet connector 2 and its position $x_i$ depends on the wavelength $\lambda_i$ of the channel being considered. The light that is fed into the mode-reducer $16_j$ at the outlet of the outlet connector 4 is the collection integral between the diffracted mode and that accepted at the inlet of the mode-reducers. In this case, and by being placed within the framework of a gaussian approximation of the amplitude of these modes, the coupling coefficient that is characterized by attenuation of the optical signal with adjacent wavelengths of the channel, that is being considered, can simply be depicted by the function:

$$Att_{dB} = 4.34\left[\frac{\frac{dx}{d\lambda}(\lambda - \lambda_i)}{w}\right]^2 \quad (1)$$

where $Att_{dB}$ is the attenuation of the optical signal expressed in decibels, λ is a wavelength adjacent to the wavelength $\lambda_i$ of the channel being considered and w is the radius of the mode measured at $1/e^2$ of the maximum of the intensity profile formed at the outlet of the expander 12 of the inlet connector and at the inlets of the mode-reducers $16_i$ of the outlet connector.

The function (1) is depicted in the graph in FIG. 5 for two different values of the radius of the mode w. The curve 17 that has the larger curvature at the center of the channel $\lambda_i$ corresponds to a radius of mode w of 4 $\mu$m and the curve 18 corresponds to a radius of mode w of 6 $\mu$m.

If one supposes that each demultiplexed channel can be used in a functioning band ±dλ around its central wavelength, then the cross-talk Xtalk of a demultiplexed channel in its adjacent channels can be calculated by substituting the separation in terms of wavelength (Δλ–dλ) of the center of the channel at the term $\lambda-\lambda_i$ by the following relationship:

$$Xtalk = 4.34\left(\frac{\frac{dx}{d\lambda}(\Delta\lambda - d\lambda)}{w}\right)^2$$

The cross-talk Xtalk for the curve 17 is above 49 dB and is far superior to the usual specification for cross-talk of 22 dB. The cross-talk measured on the curve 18 is exactly 22 dB at the limit of the functioning band (of ±0.4 nm) of the adjacent channel when Δλ=1.6 nm.

The width $\Delta\lambda_{FWHM}$ of the wavelength peak of the channel that is defined at a pre-determined level of attenuation of the optical signal (for example 3 dB) is also different for the two curves 17 and 18. By substituting the semi-width $\Delta\lambda_{FWHM}/2$ of the peak at the term $\lambda-\lambda_1$ in equation (1), this takes the following form:

$$\Delta\lambda_{FWHM} = \frac{2w\sqrt{\frac{Att_{dB}}{4.34}}}{\frac{dx}{d\lambda}}$$

At an attenuation of 3 dB for the optical signal, the expression of the width (in terms of wavelength) of the channels simplifies in the following manner:

$$\Delta\lambda_{FWHM} = 1.66\left(\frac{w}{\frac{dx}{d\lambda}}\right)$$

When the radius of the mode w increases from 4 $\mu$m to 6 $\mu$m, the width, in terms of wavelength, of the channels increases from 0.66 nm to 0.88 nm, i.e. a band width, at 3 dB attenuation, that is greater than the utilization band ±0.4 nm.

Thus the cross-talk in excess of 22 decibels can be converted into a larger width (in terms of wavelength) of the channels by regulating the radius of the communal mode w formed at the outlet of the mode-expander(s) 12 and at the inlets of the mode-reducers $16_i$. The selection of this radius w permits one to provide the required dimensions for the end of large width of the expander or the reducer whose width must evidently be of the order of 2 w.

By way of an example that is illustrated and not limitative, one will now describe a form of embodiment of the demultiplexer in accordance with the invention that is designed to satisfy the following characteristics:

| | |
|---|---|
| number (N) of channels | = 8 |
| separation (Δλ) of the channels in terms of wavelength | = 1.6 nm |
| central wavelength ($\lambda_0$) | = 1,550 nm |
| cross-talk ($X_{talk}$) in adjacent channels | = 22 dB |
| functioning band (±dλ) of the demultiplexed channels | = ±0.4 nm |
| width of the band ($\Delta\lambda_{FWHM}$) at 3 dB in each channel as large as possible. | |

In order to obtain these characteristics, one must first of all define the diffraction order (m) that provides 8 channels with a separation of 1.6 nm in the free spectral interval (ISL) of the network 3. In fact, one selects a diffraction order that is less than the limit (121) in order to minimize the variations in luminous losses in the eight channels or m=60.

One easily deduces the increment ΔL of the length of the guides of the assembly 3 that form a phase network:

$$\Delta L = m\lambda_0/n_w = 64.14 \, \mu m \text{ for } n_w = 1.45$$

In order that the demultiplexer in accordance with the invention should remain very compact, the inlet ends and outlet ends of the guides of the assembly 3 must be as close as possible, whereby proximity coupling between the channels must, however, be maintained with an attenuation greater than 20 dB as one has seen above. One therefore selects:

$$p = 18 \, \mu m.$$

The mode-expanders and the mode-reducers that are introduced in the demultiplexer in accordance with the invention have rectilinear lateral edges inclined at 0.5° to the longitudinal axis of the expander or reducer in such a way as to exhibit a maximum width of 17 $\mu$m at one end and, at the other end, a minimum width of 6.7 $\mu$m corresponding to the diameter of the mono-modal guide to which this end is connected when the manufacturing process for this guide ensures a contrast of index $\Delta n/n = 0.75\%$.

For the spacing p' of the mode-reducers $16_i$, one can select a value equal to that of p or p'=18 $\mu$m in order to maintain proximity coupling above 20 dB at all times.

Finally, one selects the communal radius for the arcs in accordance with which the mode-expanders and mode-reducers are arranged, respectively, at the inlet and the outlet of the outlet connector 4 in order to obtain a separation $\Delta\lambda = 1.6$ nm. This radius is such that:

$$R = \frac{n_s \cdot p \cdot p' \cdot n_w}{m \cdot \Delta\lambda \cdot n_g} = 4893.75 \text{ mu}$$

The parameters thus calculated permit the construction both of the inlet connector 2 and the outlet connector 4, whereby these should be identical (to within the number of inlets for connector 2 and the outlets for connector 4) in order to avoid all maladjustments of mode between the inlet guides and the outlet guides.

Of course the invention is not limited to the form of embodiment described and depicted that has been given only by way of example. Thus, as mentioned above, the inlet connector can be connected to several inlet guides through equally many mode-expanders, whereby these inlets can be used alternatively. The demultiplexer in accordance with the invention could also be used in the form of an optical wavelength multiplexer in accordance with the principle of the reversal of light.

I claim:

1. Wavelength demultiplexer that is constructed using integrated optics that comprises:
   a) at least one inlet wave-guide (1) that is fed by a plurality of optical signals in several different wavelength channels;
   b) a plurality of outlet wave-guides ($5_i$), whereby each one is traversed by one of the aforementioned wavelength channels;
   c) an assembly (3) of adjacent integrated wave-guides connected from one side to the inlet wave-guide (1) and, from the other side, to the outlet wave-guides ($5_i$) through an inlet connector (2) and an outlet connector (4), respectively, whereby the lengths of the guides of the assembly (3) increase incrementally from guide to guide in a manner such that the assembly (3) constitutes a phase network;
   d) a mode-expanding wave-guide (12) arranged at the inlet of the inlet connector (2) and connected to the inlet wave-guide (1);
   e) a plurality of mode-reducing wave-guides ($16_i$) arranged at the outlet of the outlet connector (4) and connected in each case to one of the outlet wave-guides ($5_i$), characterized by the feature that the aforementioned mode-expanding guide (12) and the aforementioned mode-reducing guides ($16_i$) are of identical geometry with a width that varies linearly in accordance with their length, whereby the width of the aforementioned expanding guides and reducing guides at their connection to the associated connector is defined in order to optimize the width of the band passing through a channel while limiting the cross-talk between outlet channels ($5_i$) to a pre-determined level.

2. Demultiplexer in accordance with claim 1, characterized by the feature that it also comprises f) a mode-reducing wave-guide ($13_j$) between the inlet connector (1) and an end of each of the guides of the assembly (3) of wave-guides forming a phase network and g) a mode-expanding wave-guide ($15_j$) between the other end of each of the guides of this assembly (3) and the outlet connector (4), whereby the aforementioned expanding guides ($15_j$) and reducing guides ($13_j$) are of identical geometry with a width that varies linearly in accordance with their length and they have been provided with certain dimensions in order to reduce proximity coupling between the guides of the assembly (3) to a pre-determined low level.

3. Demultiplexer in accordance with claim 1 characterized by the feature that each connector (2; 4) comprises a core region (9; 14) where the propagation of light is effected without lateral confinement between at least one inlet mode-expander (12; $15_j$) and a plurality of outlet mode-reducers ($13_j$; $16_i$).

4. Demultiplexer in accordance with claim 1 characterized by the feature that the cross-talk between the outlet guides ($5_2$) corresponds to an attenuation of the signal in a given channel that is greater than 20 dB.

5. Demultiplexer in accordance with claim 2, characterized by the feature that proximity coupling between the guides of the assembly (3) corresponds to an attenuation of the signal in a given guide that is greater than 20 dB.

6. Demultiplexer in accordance with any one of the preceding claims that is constructed by chemical deposition in the vapor phase (CVD), characterized by the feature that the inlet wave-guides (1) and the outlet wave-guides ($5_i$) as well as the wave-guides of the assembly (3) are mono-modal and by the feature that the mode-expanders and mode-reducers exhibit rectilinear lateral edges that are inclined at approximately 0.5° to their longitudinal axis and by the feature that the width of an expander or of a reducer at its connection to the associated inlet or outlet connector is approximately 17 $\mu$m.

7. Demultiplexer in accordance with claim 2, characterized by the feature that the band width ($\lambda_{FWHM}$) in a given channel is greater than approximately ±0.1 nm.

8. Use of a demultiplexer in accordance with any one of the claims 1 to 5 in the form of an optical wavelength multiplexer.

9. Use of a demultiplexer according to any one of claims 1–5 or 7 in the form of an optical wavelength multiplexer.

\* \* \* \* \*